June 6, 1950 K. M. WATSON 2,510,444
APPARATUS FOR PYROLYTIC CONVERSION OF HYDROCARBONS
Filed June 27, 1947
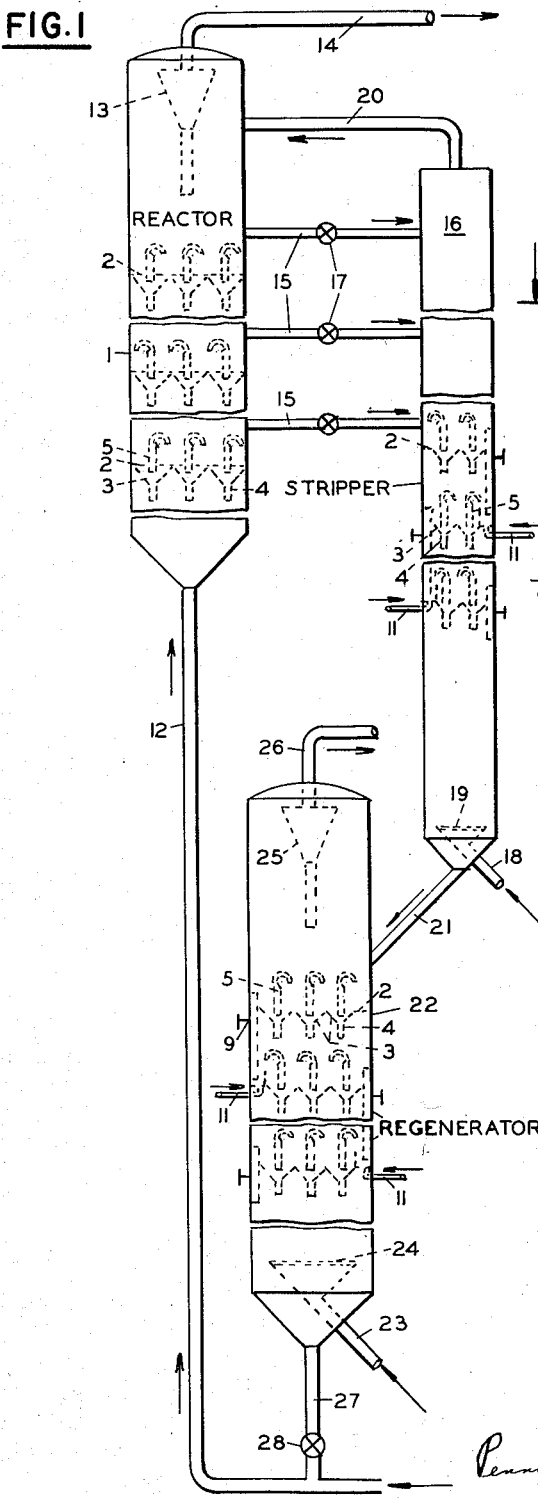
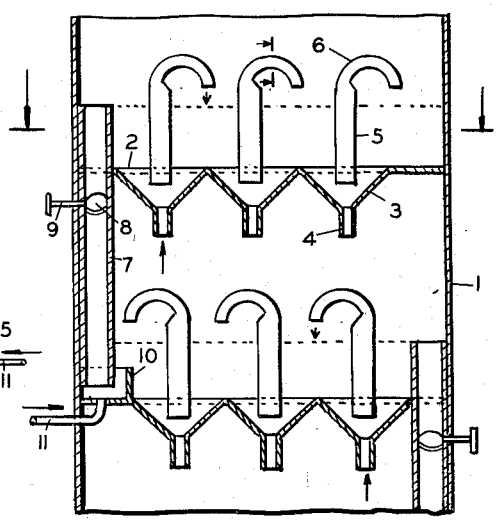
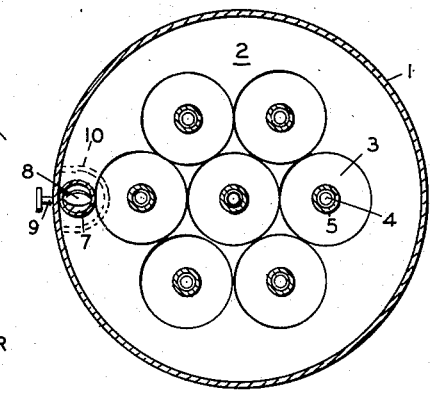
INVENTOR
KENNETH MERLE WATSON
BY
ATTORNEYS Patented June 6, 1950

2,510,444

UNITED STATES PATENT OFFICE 2,510,444

APPARATUS FOR PYROLYTIC CONVERSION OF HYDROCARBONS

Kenneth Merle Watson, Madison, Wis., assignor to Sinclair Refining Company, New York, N. Y., a corporation of Maine Application June 27, 1947, Serial No. 757,649

4 Claims. (Cl. 23—288)

This invention relates to the art of oil refining and provides improved apparatus especially adapted to use in that art.

The apparatus of my present invention is especially useful in pyrolytic conversion operations involving the use of a finely divided solid catalyst and provides means for effecting more uniform contact between the hydrocarbon vapors and the finely divided catalyst. The invention is also useful in effecting scrubbing and fractionation of mixed vapors, for instance, effluent vapors from the distillation or conversion of hydrocarbons.

The invention is especially applicable to conversion processes of the general type wherein a finely divided catalyst is brought into intimate contact with vaporized hydrocarbons to be converted in a reaction zone, spent catalyst is separated from the oil vapors, the separated catalyst stripped of oil by contact with a gaseous stripping medium in a stripping zone, regenerated by decarbonization in a regenerating zone and the regenerated catalyst returned to the reaction zone for contact with further hydrocarbon vapors to be converted.

Operations of the type described are commonly designated fluid catalyst processes. In conventional operation, spent catalyst from the reaction zone is stripped by contact with steam in a stripping zone, the carbon deposited on the catalyst particles is burned off by contact with air in a regenerating zone and the regenerated catalyst in fluid suspension is returned to the reaction zone.

An important consideration in operations of this type, from a practical aspect, is the efficient utilization of the catalyst. For maximum efficiency it is necessary that all of the catalyst be utilized to an equal extent in the reaction zone and passed to the regenerator and that in the regenerator all the catalyst be uniformly regenerated and returned to the reaction zone.

In operations of this type, the catalyst is usually maintained throughout the system in a fluidized condition. However, the catalyst is normally not of uniform density throughout the various stages of the operation. In both the reaction and regenerating zones, and also in the stripping zone, there is normally maintained a so-called "high density," or "dense phase" body of catalyst of considerable depth through which the gases or vapors pass and above which the catalyst in relatively low concentration is suspended in the gases or vapors.

In conventional operation, these dense phase bodies of catalyst are in a continuously turbulent state. Because of this condition, there is frequently a top-to-bottom mixing of the catalyst resulting in a homogeneous mass of catalyst in the bed. While this is beneficial from a temperature control viewpoint, an advantage of fluidized technique in catalytic conversion, there is an inherent disadvantage in that the fresh incoming catalyst, partially spent catalyst and spent catalyst, in the case of the reactor, become intermixed in the catalyst bed. When catalyst is withdrawn from the bed for regeneration, this homogeneous mixture is taken off and not a truly spent catalyst. Also, due to the intermixing of the fresh and spent catalyst, the effective activity of the catalyst in the bed is less than if spent catalyst were not also present.

Similarly, in the stripper and in the regenerator, a more complete stripping and burning off of oil and carbonaceous material from the catalyst, respectively, would be possible if it were not for the mixing of the stripped and unstripped and the regenerated and partially regenerated catalyst in the respective zones.

Further, the catalyst-vapor contact in the reactor and in the stripper and the contact between the catalyst and regenerating gases in the regenerator, are not as intimate and uniform as desirable. In the large turbulent beds of catalyst there is a tendency for large globules of the vapors or gases to pass upwardly through the catalyst bed without coming into intimate contact with the catalyst.

The present invention provides improved means of avoiding, to a major extent at least, objectionable intermixing of the catalyst in different stages of activity and for effecting more uniform contact between the catalyst and vapors or gases while maintaining the fluidized principle of operation.

In my copending application, Serial No. 757,643 filed concurrently herewith, I have described and claimed an improved method of operation whereby I avoid the indiscriminate mixing of catalyst of different stages of activation in the reaction zone, for instance, by dividing the reaction chamber into a plurality of vertically spaced zones by a plurality of vertically spaced trays. A body of dense phase fluidized catalyst is maintained on each of the trays. Regenerated catalyst is introduced into an end zone of the chamber and is passed through the chamber from tray to tray, advantageously moving across each tray, until it reaches the other end zone of the chamber, from which it is withdrawn and passed to the stripping zone. The hydrocarbon vapors to be converted are introduced into the lower zone of the chamber and pass upwardly therethrough in contact with the catalyst on the successively higher trays. In this way, top-to-bottom mixing of the catalyst is prevented and the hydrocarbon vapors are passed in contact with catalyst of progressively greater or lower catalytic activity, as they pass through the reaction chamber.

Further, the process provides a novel method of increasing the extent and uniformity of contact between the vapors and the catalyst without objectionable mixing of catalyst of unlike activity. This is effected, in accordance with my present invention by passing the vapors through the respective bodies of catalyst as a plurality of restricted streams flowing at such velocity that a portion of the catalyst from the lower ends of the respective beds is entrained by the vapors and carried upwardly and thereafter I subject the resultant suspension to centrifugal forces whereby the catalyst is, to a large extent at least, separated from the vapors and returned directly to the bed from which it was carried by the vapor streams and is thereafter re-entrained by further vapors, as just described.

This method of effecting uniform and extended contact with the catalyst may, with advantage, be employed in the stripping of the catalyst and also in the regeneration of the catalyst, as well as in the reaction zone, and may be employed in any one, or more, of these zones. It may be used with particular advantage in the stripping of readily vaporizable hydrocarbons from the catalyst.

The apparatus of my present invention, in its broader aspect, comprises a vertically elongated chamber divided into a plurality of vertically positioned zones by one or more trays extending generally horizontally across the chamber and having a plurality of downwardly projecting funnel-shaped members. Positioned coaxially with the respective funnels is an inverted J tube, the lower end of which is spaced vertically from the lower inner surface of the body of the funnel so as to permit material in the funnel to flow into the lower end of the J tube. The upper end of the J tube is curved over at an angle of about 180° and has the cross-section of an open semicircle of approximately the diameter of the intermediate and lower sections of the tube. The tray may also be provided with a standpipe, advantageously valved, extending through the tray from a point somewhat above to a point just above the next lower tray.

My present apparatus may be used with particular advantage in the carrying out of the process just described and is applicable to the reactor, the stripper, and the regenerator, or any one or more of these chambers.

The apparatus of the invention is adapted to continuous operation, in carrying out the described process comprising a plurality of cooperating steps so coordinated as to constitute a unitary operation in which a charge of catalyst is repeatedly used, intermittently regenerated and returned to the reaction zone and in which increased catalytic efficiency and catalyst life is attained.

The invention in its broader aspect, is applicable to either generally concurrent or countercurrent flow through the reactor, stripper and regenerator. In other words the catalyst may be fed separately to the upper zone of the chamber or may be fed to the lower end, in the suspension in the vapors or gases for instance, and carried thereby from zone to zone upwardly through the chamber in suspension, with the described recirculation within the respective zones.

The invention will be more fully described and illustrated with reference to the accompanying drawings of which:

Figure 1 represents conventionally and somewhat diagrammatically a vertical section of a fluid catalyst cracking apparatus embodying my invention;

Figure 2 is an enlarged fragmentary view of the interior arrangement of the reactor, the stripper and the regenerator;

Figure 3 is a cross-sectional view of Figure 2 along the lines 3—3; and

Figure 4 is a somewhat enlarged cross-sectional view of the element 6 of Figure 2.

Referring more particularly to Figure 1 of the drawings, the apparatus indicated by the reference numeral 1 represents a generally cylindrical reactor provided internally with a plurality of trays 2 extending entirely across the reactor and dividing the reactor into a plurality of zones. As shown more clearly in Figures 2 and 3, the trays are made up largely of a plurality of uniformly spaced downwardly projecting funnel-shaped members comprising cones 3 terminating at their lower end in a short vertically positioned tube or nipple 4. Coaxially positioned above each of the tubes 4 is a vertically positioned tube 5 of somewhat larger diameter, terminating at its lower end a substantial distance from the upper end of tube 4.

The upper end 6 of the tube 5 has the cross-section of an open semicircle of approximately the diameter of the intermediate and lower sections of tube 5, as more clearly shown in Figure 4, and is curved over at an angle of approximately 180° so as to form an inverted J tube. For counter flow of catalyst and gases alternate sides of opposite trays may be provided with standpipes 7, in which there is interposed a valve arrangement 8, for instance, a conventional butterfly valve controlled by shaft 9, the standpipe projecting from a substantial distance above one tray to just above the next lower tray and there terminating in a trap or seal 10. Line 11 leads into the lower end of the trap terminating beneath standpipe 7.

In operation, the catalyst suspended in charge oil vapors is passed to the lower zone of reactor 1 through elevator conduit 12 upwardly through tubes 4 and is separated from the conveying medium forming a dense phase body of fluidized catalyst on the lower tray 2. A portion of the catalyst is carried by the vapors upwardly into the next higher zone forming a dense phase bed of catalyst on the next higher tray and so on until each of the trays is filled. The bed of catalyst will build up on the respective trays to a depth such that the rate of carry-over of the catalyst to the next higher tray equals the rate at which the catalyst is introduced to the lower zone of the reactor. By properly proportioning the areas and lengths of the risers, the dense phase catalyst bed may be caused to occupy a major portion of the volume of the reactor.

Vaporized feed oil, charged to the lower zone of the reactor through line 12, passes upwardly therethrough at a relatively low velocity until it reaches the lowermost tray 2 and passes upwardly through tubes 4 into the lower end of the respective cones 3.

By reason of the restricted area, the hydrocarbon vapors pass upwardly through tubes 4 at a relatively high velocity and, from thence, upwardly through the respective tubes 5, carrying in suspension finely divided catalyst picked up in the respective conical members. Upon entering the upper portion 6 of tubes 5, by reason of the change in direction of flow, a large portion of the catalyst is thrown out of suspension by centrifugal force and returned directly to the bed of catalyst on the tray.

On passing from tubes 5, the velocity of the hydrocarbon vapors is again reduced and a further portion of the catalyst carried in suspension therein is precipitated.

In continuing their upward passage through the reactor, the hydrocarbon vapors encounter the next higher tray 2 and the procedure just described is there repeated.

In the drawing only three such trays have been shown; however, it will be understood that any desired number of trays may be employed.

The hydrocarbon vapors in the upper zone of the reactor have been uniformly contacted with the catalyst and the conversion thereof effected. These vapors pass from the upper portion of the reactor through cyclone type separator 13, for the separation of suspended catalyst, and pass therefrom through conduit 14 to fractionating apparatus, not shown in the drawing. Separated catalyst is returned to the body of catalyst in the reactor.

Spent catalyst may pass from one or more zones of the reactor through conduits 15, to stripper 16, the flow of the catalyst being controlled and regulated by valves 17. A stripping medium, steam for instance, is introduced into the lower end of the stripper through line 18 and distributor plate 19 and passes upwardly therethrough in contact with the downwardly gravitating catalyst in the respective zones.

I have described concurrent flow in the reactor. Countercurrent flow will be illustrated in the stripper and regenerator. The system shown is particularly advantageous as it necessitates the use of only one elevation of the catalyst and simplifies conveyance of the catalyst from zone to zone.

The internal arrangement of the stripper and the regenerator are substantially as described with reference to the reactor except that in concurrent flow the standpipes 7 are not required, and the description need not be repeated, like parts being indicated by like reference numerals.

Steam, together with hydrocarbons stripped from the catalyst pass from the upper portion of the stripper through line 20 into the upper portion of the reactor.

Catalyst which has been stripped by contact with the stripping medium flows from the lower end of the stripper through conduit 21 into the upper zone of the regenerator 22, which is provided with trays such as described with reference to the reactor and the stripper, like parts being indicated by like reference numerals, the detailed description of which need not here be repeated.

The catalyst gravitates downwardly through the regenerator, as previously described, countercurrent to a stream of air introduced into the lower end of the regenerator through line 23 and distributor plate 24 and the carbonaceous deposit is burned off therefrom by contact with the air. The products of combustion pass from the upper end of the regenerator through cyclone type separator 25 and, from thence, through conduit 26 to a precipitator, or stack, not shown in the drawing.

The regenerator may be provided with conventional means for extracting from the catalyst undergoing regeneration, an amount of heat sufficient to prevent excessive temperature rise.

Regenerated catalyst flows from the bottom of the regenerator through conduit 27, at a rate controlled by valve 28, into the lower end of elevator conduit 12, where it is picked up by the stream of vaporized charge oil and carried up into and through the reactor, as previously described.

In countercurrent flow as in the stripper and the regenerator two alternate methods of operation may be employed. One is to so proportion the areas and lengths of the risers that some catalyst will flow downward from plate to plate in spite of the upward movement of the gases and the localized recirculation of catalyst on each plate. Downward flow of catalyst in the risers of such plates takes place even when the normal velocities in the risers are higher than those required for the catalyst carryover. The down flow of catalyst results from the surging that is inherent in a fluidized catalyst bed, which causes frequent local changes in density, with the result that for a short period the catalyst may flow down some risers while the bulk of the fluid stream goes up others. A shift of bed will change this situation, causing other risers to drop catalyst downward. This tendency for backflow of catalyst diminishes as the velocities and pressure drop in the risers increase.

An alternate method of operation provides for positive downflow of the catalyst through standpipe 7, more clearly shown in Figure 2 of the drawings. In this method of operation the standpipes operate in a manner similar to the standpipes of a conventional bubble tower. The top of each standpipe constitutes a weir which maintains the level of the dense phase fluid catalyst bed at the desired depth on the plate. The lower end of this standpipe dips into a trap or seal on the next lower plate, which is below the level of the dense phase fluid catalyst bed on this plate. This seal prevents gas from blowing up the standpipe as a result of the formation of a relatively dense bed of catalyst in the standpipe. In order to insure flow of the catalyst in these standpipes small amounts of air or steam are introduced in controlled quantities through lines 11 to maintain fluidization in the standpipes. This arrangement has the advantage of permitting relatively high velocities and high recirculation rates on the plates while at the same time insuring positive downflow of the catalyst. Either method of operation is also applicable to the reactor as well as the stripper and regenerator and any number of trays may be used in either.

By the arrangement shown, objectionable mixing of catalyst in different stages of activity is, to a major extent, avoided and the gaseous medium, that is, hydrocarbon vapors, stripping medium or regenerating air, is brought into contact with catalyst of uniform composition and progressively higher or lower catalytic activity in the respective zones.

The invention is applicable, as previously noted, to either the reactor, the stripper, and the regenerator, or either of them. The number and the transverse dimensions of the risers 4 and 5 are, with advantage, so coordinated with the volume of gaseous medium to be passed upwardly therethrough that the suspension will pass upwardly through the risers at a velocity within the range of from 2 to 10 feet per second. At such velocities, maximum entrainment of the catalyst in the conical members 3 is attained.

In addition to use in the effecting of uniform contact between a gaseous medium and a finely divided catalyst, the apparatus of my invention, as previously noted, is also applicable to the fractionation of hydrocarbon vapors, globules of condensate suspended in the vapors being effectively precipitated and separated therefrom by means of centrifugal action in the upper portion of the riser tubes 5.

The depth of the dense phase body of catalyst on the respective trays may be controlled by adjustment of the valve 8 in the standpipe 7 so as to maintain a substantial depth of catalyst above the upper end of standpipe 8 which, together with the body of catalyst within the standpipe, effectively prevents the passage of vapors upwardly therethrough.

The catalyst is thus caused to flow generally horizontally across the respective plates while being repeatedly suspended in and separated from the rising vapors. On reaching the standpipe 7, the catalyst passes to the next lower tray and flows thereon substantially horizontally in the opposite direction across that tray while again being repeatedly suspended in and separated from the gaseous medium.

The diameter of the lower opening in the funnel-shaped member may be varied somewhat depending upon the number of funnel-shaped members in the respective trays and the relative velocities desired. Generally, these openings should be relatively small so as to afford large entrainment areas relative to the volume of gases passed therethrough. Such openings of about 1 to 3 inches in diameter will give highly effective results.

It is usually advantageous that the inner diameter of the body portion of the J tube be somewhat larger than the lower opening of the funnel so that the major portion, at least, of the gas stream passing through the funnel, is jetted directly into the body portion of the J tube. For instance, with a lower funnel opening of two inches in diameter, the opening through the body portion of the J tube may, with advantage, be about 2½ inches in diameter.

The catalyst may be of the type conventionally used in fluid catalyst processes, for instance, a silica-alumina type catalyst in finely divided or powdered form. The reaction conditions may, likewise, be those conventionally used in operations of this type, and as understood by the art, the optimum temperatures and pressures will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of 5 to 25 pounds per square inch. The regeneration temperature may be within the range of 950° to 1,200° F., heat for the reaction being supplied largely by the hot catalyst passing from the regenerator to the reaction zone.

It will be understood that the present invention is not restricted to the particular embodiment thereof herein described, but is applicable to various modifications of fluid catalyst processes, and to stripping and fractionating processes generally.

I claim:
1. Apparatus of the type described comprising a vertically elongated chamber, a plurality of vertically spaced trays extending generally horizontally across the chamber and comprising a plurality of downwardly projecting funnel-shaped members open at their upper and lower ends, an inverted J tube positioned above each funnel member so that its body portion extends substantially vertically and is coaxially positioned with respect to the respective funnels, having its lower end vertically spaced from the lower inner surface of the funnel and its upper end curved over at an angle of about 180°.

2. Apparatus of the type described comprising a vertically elongated chamber, a plurality of vertically spaced trays extending generally horizontally across the chamber and comprising a plurality of downwardly projecting funnel-shaped members open at their upper and lower ends, an inverted J tube positioned above each funnel member so that its body portion extends substantially vertically and is coaxially positioned with respect to the respective funnels, having its lower end vertically spaced from the lower inner surface of the funnel and its upper end curved over at an angle of about 180° and of a transverse area smaller than that of the body portion of the J tube.

3. Apparatus of the type described comprising a vertically elongated chamber, a plurality of vertically spaced trays extending generally horizontally across the chamber and comprising a plurality of downwardly projecting funnel-shaped members open at their upper and lower ends, an inverted J tube positioned above each funnel member so that its body portion extends substantially vertically and is coaxially positioned with respect to the respective funnels, having its lower end vertically spaced from the lower inner surface of the funnel and its upper end curved over at an angle of about 180° and of a transverse area smaller than that of the body portion of the J tube, the inner diameter of the body portion of the J tube being somewhat larger than the inner diameter of the smaller opening in the funnel.

4. Apparatus for effecting intimate and uniform contact between a finely divided fluidized solid and a gaseous medium comprising a vertically elongated chamber, a plurality of vertically spaced trays extending generally horizontally across the chamber and comprising a plurality of downwardly projecting funnel-shaped members open at their upper and lower ends, an inverted J tube positioned above each funnel member so that its body portion extends substantially vertically and is coaxially positioned with respect to the respective funnels, having its lower end vertically spaced from the lower inner surface of the funnel and its upper end curved over at an angle of about 180°, conduit means adapted to the introduction of the fluidized solid to an upper zone of the chamber, conduit means adapted to the withdrawal of fluidized solid from a lower zone of the chamber, conduit means adapted to the introduction of a gaseous medium to a lower zone of the chamber, conduit means adapted to the withdrawal of a gaseous medium from an upper zone of the chamber and a standpipe extending through each tray from a point substantially above the tray to a point just above the next lower tray.

KENNETH MERLE WATSON.

No references cited.